US010775795B2

(12) United States Patent
Tanaka et al.

(10) Patent No.: US 10,775,795 B2
(45) Date of Patent: Sep. 15, 2020

(54) NAVIGATION SYSTEM, NAVIGATION METHOD, AND RECORDING MEDIUM (71) Applicant: HONDA MOTOR CO., LTD., Minato-ku, Tokyo (JP)

(72) Inventors: Yuki Tanaka, Wako (JP); Kenta Kawakami, Wako (JP); Tomoya Miyazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/910,092

(22) Filed: Mar. 2, 2018

(65) Prior Publication Data
US 2018/0267546 A1  Sep. 20, 2018

(30) Foreign Application Priority Data

Mar. 17, 2017 (JP) ................. 2017-052773

(51) Int. Cl.
*G10L 15/22* (2006.01)
*G01C 21/34* (2006.01)
(Continued)

(52) U.S. Cl.
CPC ........... *G05D 1/0212* (2013.01); *B60W 30/00* (2013.01); *G01C 21/3415* (2013.01);
(Continued)

(58) Field of Classification Search
CPC ............... G05D 1/0212; G05D 1/0088; G05D 2201/0212; G01C 21/3415; G10L 15/1815; G10L 15/22
(Continued)

(56) References Cited

U.S. PATENT DOCUMENTS

2002/0035475 A1* 3/2002 Yoda ........................ G10L 15/24
704/270
2008/0133230 A1* 6/2008 Herforth ................ G01C 21/26
704/235
(Continued)

FOREIGN PATENT DOCUMENTS

JP  2002-366166  12/2002
JP  2004-340727  12/2004
(Continued)

OTHER PUBLICATIONS

Japanese Office Action for Japanese Patent Application No. 2017-052773 dated Dec. 21, 2018.
(Continued)

Primary Examiner — Charles J Han
(74) Attorney, Agent, or Firm — Amin, Turocy & Watson, LLP (57) ABSTRACT A navigation system includes a detector configured to detect a situation in a movable object, a determiner configured to determine a degree of activity of conversation in the movable object on the basis of a detection result by the detector, a movement plan setter configured to set a movement plan on the basis of setting information which is set by a user, and to change at least part of the set movement plan on the basis of a determination result by the determiner, and a navigator configured to navigate the movable object on the basis of the movement plan which is set or changed by the movement plan setter.

7 Claims, 6 Drawing Sheets (51) Int. Cl.
  *B60W 30/00* (2006.01)
  *G05D 1/02* (2020.01)
  *G05D 1/00* (2006.01)
  *G10L 15/18* (2013.01)
  *G10L 25/51* (2013.01)

(52) U.S. Cl.
  CPC ........ *G05D 1/0088* (2013.01); *G10L 15/1815* (2013.01); *G10L 15/22* (2013.01); *G05D 2201/0212* (2013.01); *G10L 25/51* (2013.01)

(58) Field of Classification Search
  USPC .......................................................... 701/26
  See application file for complete search history.

(56) References Cited

U.S. PATENT DOCUMENTS

| | | | | |
|---|---|---|---|---|
| 2009/0318777 | A1* | 12/2009 | Kameyama | G06F 16/24575 600/301 |
| 2012/0143501 | A1* | 6/2012 | Tang | G01C 21/3476 701/465 |
| 2015/0160013 | A1* | 6/2015 | Bamba | G01C 21/3415 701/408 |
| 2015/0338229 | A1* | 11/2015 | Yuan | G06Q 30/0641 701/539 |
| 2016/0021047 | A1* | 1/2016 | Sawato | H04L 51/20 455/456.3 |
| 2016/0180837 | A1* | 6/2016 | Gustavsson | G06F 1/3203 704/251 |

FOREIGN PATENT DOCUMENTS

| | | |
|---|---|---|
| JP | 2008-082822 | 4/2008 |
| JP | 2009-109758 | 5/2009 |
| WO | 2016/121174 | 8/2016 |

OTHER PUBLICATIONS

Japanese Office Action for Japanese Patent Application No. 2017-052773 dated Mar. 26, 2019.

* cited by examiner

NAVIGATION SYSTEM, NAVIGATION METHOD, AND RECORDING MEDIUM

CROSS-REFERENCE TO RELATED APPLICATION

Priority is claimed on Japanese Patent Application No. 2017-052773, filed Mar. 17, 2017, the content of which is incorporated herein by reference.

BACKGROUND OF THE INVENTION

Field of the Invention

The present invention relates to a navigation system, a navigation method, and a recording medium.

Description of Related Art

In a case in which a vehicle is driven by using a navigation device, an efficient course, such as a route through which the vehicle arrives at a destination quickest, or a route through which a drive distance is the shortest, is set in many cases. However, with the progress of automated driving techniques, the number of users who enjoy ride time in vehicles as well as using vehicles as movement means is increasing.

In the related art, a technique in which, in order to complete reproduction of music at a point in time when a vehicle arrives at a destination, a course is searched again so that the vehicle arrives at the destination without excess or deficiency on the basis of a remaining reproduction time of music is known (see, for example, Japanese Unexamined Patent Application, First Publication No. 2004-340727).

SUMMARY OF THE INVENTION

However, in a case in which conversation becomes active at a timing when a vehicle arrives at a destination, the conversation is not able to continue, and comfortable ride time is not able to be provided in some cases.

The present invention is made in consideration of such circumstances, and an object of the present invention is to provide a navigation system, a navigation method, and a storage medium capable of providing comfortable ride time.

A navigation system, a navigation method, and a storage medium according to the present invention employ the following constitution.

(1) A navigation system includes a detector configured to detect a situation in a movable object, a determiner configured to determine a degree of activity of conversation in the movable object on the basis of a detection result by the detector, a movement plan setter configured to set a movement plan on the basis of setting information which is set by a user, and to change at least part of the set movement plan on the basis of a determination result by the determiner, and a navigator configured to navigate the movable object on the basis of the movement plan which is set or changed by the movement plan setter.

(2) In (1), in a case in which it is determined that the conversation is in an active state, the movement plan setter changes the movement plan to delay arrival.

(3) In (1), the navigation system further includes a topic provider configured to provide a topic to the inside of the movable object on the basis of the determination result by the determiner.

(4) In (1), the navigation system further includes an analyzer configured to analyze content of the conversation in the movable object on the basis of the detection result by the detector, and the movement plan setter changes at least a part of the set movement plan on the basis of an analyzation result by the analysis unit.

(5) In (1), the movement plan setter searches for a relation point on a map which is related to an active topic on the basis of the determination result by the determiner and the analyzation result by the analyzer and changes at least a part of the set movement plan to a movement plan for the relation point.

(6) In (1), after the movement plan setter changes the at least a part of the set movement plan to the movement plan for the relation point, the movement plan setter prohibits changing the movement plan for the relation point to another movement plan in which the relation point is not on a route.

(7) A navigation method using an in-vehicle computer, comprising, detecting a situation in a movable object, determining a degree of activity of conversation in the movable object on the basis a detection result, setting a movement plan on the basis of setting information which is set by a user, changing at least part of the set movement plan on the basis of a determination result of the degree of activity of the conversation in the movable object, and navigating the movable object on the basis of the set or changed movement plan.

(8) A non-transitory computer-readable recording medium recording a vehicle control program causing an in-vehicle computer to perform, detecting a situation in a movable object, determining a degree of activity of conversation in the movable object on the basis a detection result, setting a movement plan on the basis of setting information which is set by a user, changing at least a part of the set movement plan on the basis of a determination result of the degree of activity of the conversation in the movable object, and navigating the movable object on the basis of the set or changed movement plan.

According to (1), (2), (7), (8), it is possible to change the movement plan according to activity in a vehicle, and thus a user can enjoy a drive suitable for an atmosphere in the vehicle.

According to (3), the conversation in the vehicle is stimulated, and thus friendship between occupants can be promoted.

According to (4), it is possible to change the movement plan according to the conversation in the vehicle, and thus a user can enjoy a drive suitable for the conversation in the vehicle.

According to (5), it is possible to go to a place mentioned in the conversation, and thus a drive can be further enjoyed.

According to (6), it is possible to set the movement plan of which a priority is the topic in the vehicle in comparison with the activity in the vehicle.

DETAILED DESCRIPTION OF THE INVENTION

Hereinafter, embodiments of a navigation system, a navigation method, and a storage medium of the present invention will be described with reference to the drawings.

First Embodiment

Figure 1:
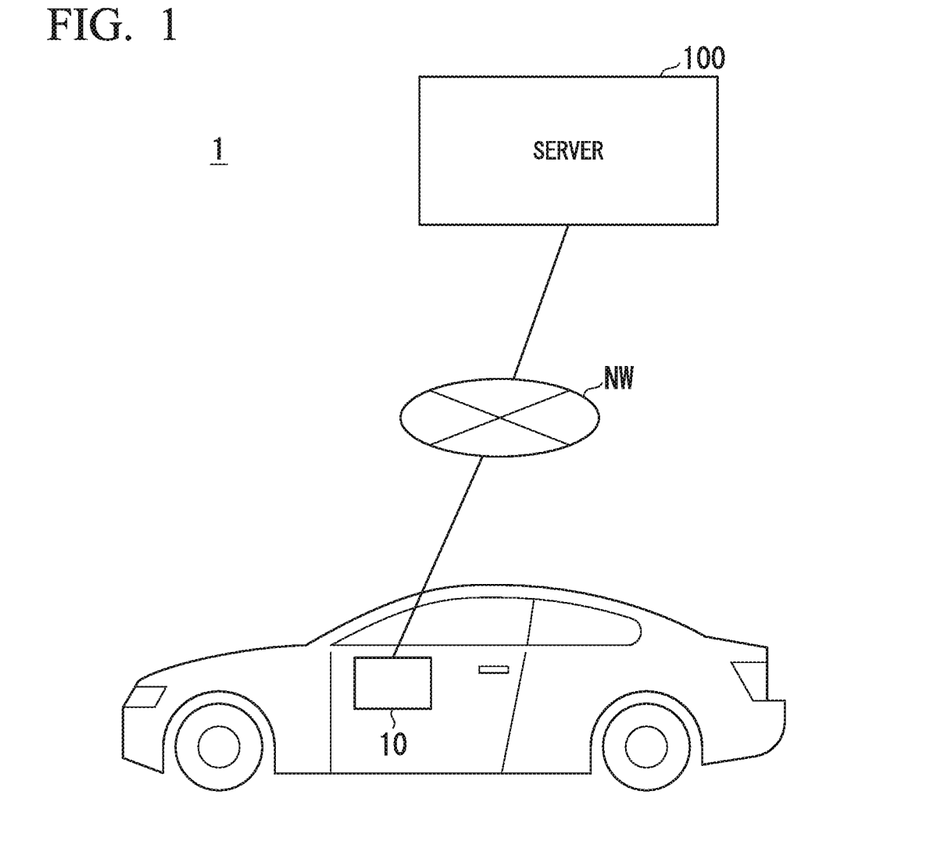
FIG. 1 is a diagram schematically showing a navigation system according to a first embodiment.

FIG. 1 is a diagram schematically showing a navigation system 1. As shown in FIG. 1, the navigation system 1 includes one or more navigation devices 10 which communicate with each other through a network NW, and a server 100. For example, the network NW includes one or all of a wide area network (WAN), a local area network (LAN), the Internet, a provider device, a wireless base station, a dedicated line, and the like.

For example, the navigation device 10 is installed in a movable object such as a four-wheel vehicle, a three-wheel vehicle, a ship, an airplane, a helicopter, a hovercraft, or the like. The movable object is a vehicle that can perform automated driving, and in the vehicle, seats may be rotatable so that occupants can face each other.

The server 100 stores various types of information, and for example, stores information on a user registered in advance (hereinafter referred to as user registration information). The user registration information includes information on an age of the user, a sex of the user, a hobby of the user, a movement plan used by the user in the past, and the like.

Figure 2:
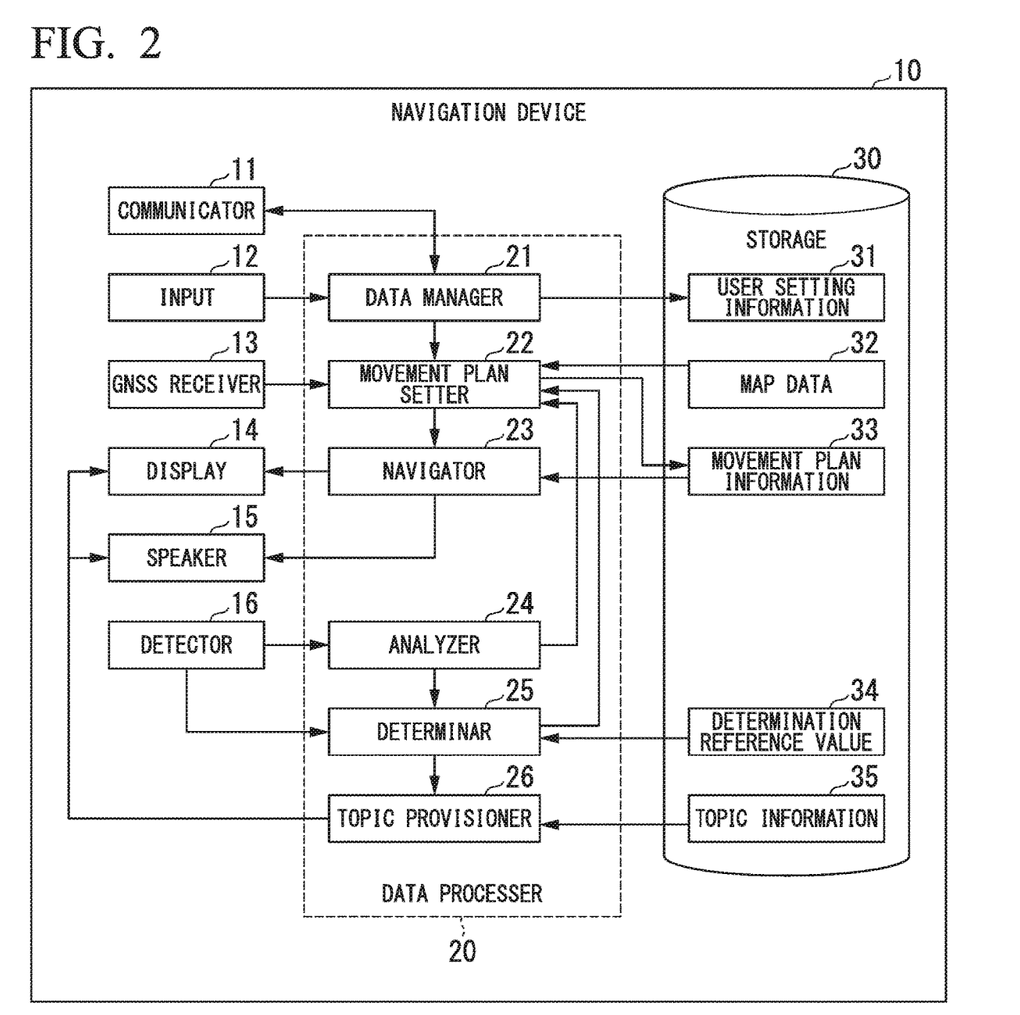
FIG. 2 is a diagram showing a functional constitution of a navigation device.

FIG. 2 is a diagram showing a functional constitution of the navigation device 10. As shown in FIG. 2, the navigation device 10 includes a communicator 11, an input 12, a GNSS receiver 13, a display 14, a speaker 15, a detector 16, a data processor 20, and a storage 30.

For example, the communicator 11 communicates with the server 100 through the network NW. The communicator 11 acquires the various types of information from the server 100 and outputs the various types of information to the data processor 20, through the network NW.

For example, the input 12 includes one or all of various keys, a button, a dial switch, a mouse, a touch panel integrally formed with the display 14, and the like.

The global navigation satellite system (GNSS) receiver 13 specifies the position of the vehicle in which the navigation device 10 is installed on the basis of a signal received from a satellite which constitutes a global positioning type positioning system such as GLONASS or Galileo.

For example, the display 14 is a liquid crystal display (LCD), an organic electroluminescence (EL) display device, or the like.

The speaker 15 outputs a sound on the basis of information input from the data processor 20.

For example, the detector 16 includes a microphone or a camera, detects a sound in a vehicle or scenery, and outputs a detection result (for example, sound data, image data, or the like) to the data processor 20.

For example, each element of the data processor 20 is realized by a processor such as a central processing unit (CPU) executing a program (software) stored in the storage 30. Some or all of the elements of the data processor 20 may be realized by hardware such as a large-scale integration (LSI), an application specific integrated circuit (ASIC), or a field-programmable gate array (FPGA), or may be realized by a combination of software and hardware. The program may be previously stored in a storage device such as a hard disk drive (HDD) or a flash memory, or may be stored in an attachable and detachable storage medium such as a DVD or a CD-ROM and then may be installed in the storage device by installing the storage medium in a drive device. The data processor 20 includes a data manager 21, a movement plan setter 22, a navigator 23, an analyzer 24, a determiner 25, and a topic provider 26.

The data manager 21 stores the various types of information acquired using the communicator 11 or the input 12 in the storage 30. The data manager 21 transmits the various types of information and the like read from the storage 30 to the server 100 through the communicator 11 and the network NW.

For example, the movement plan setter 22 generates one or more movement plans with reference to map data 32 on the basis of the position of a host vehicle specified by the GNSS receiver 13 (or an arbitrary input position), and setting information which is input by an occupant by using the input 12. The movement plan includes a course to a destination or stops, an arrival time to a destination or stops, the necessary time to a destination or stops, and the like. The movement plan setter 22 sets one generated movement plan as a guidance target by the navigator 23.

For example, the setting information includes a destination, stops, the purpose of a drive, a maximum necessary time, an arrival time, course content, and the like. For example, the purpose of the drive includes shopping, a tea party in the vehicle, refreshment, and the like. The maximum necessary time is the maximum value usable in the movement plan. The course content is a setting capable of synthetically determining the purpose of the movement plan, the necessary time, and the like, and for example, includes a course in which shopping is allowed for about an hour, a course for chatting leisurely for two hours, and the like.

The navigator 23 provides information on the route using the display 14 and the speaker 15 on the basis of the movement plan which is set by the movement plan setter 22, and guides the vehicle. For example, the navigator 23 may provide information on the route by using a terminal device such as a smart phone or a tablet terminal possessed by an occupant.

The analyzer 24 analyzes the content of the conversation in the vehicle on the basis of the detection result by the detector 16. For example, the analyzer 24 recognizes a sound on the basis of sound data, creates text data of the conversation content, and outputs the text data to the determiner 25. The analyzer 24 may analyze the sound data, and may acquire a sound of laughter, clapping, and the like as an analyzation result. The analyzer 24 may analyze a still image or a video imaged by a camera to acquire a smiling face, a direction of a face, or the like as the analyzation result.

The determiner 25 determines the degree of activity of the conversation in the vehicle on the basis of the detection result by the detector 16 and an analyzation result by the analyzer 24. For example, in a case in which a predetermined condition is satisfied, the determiner 25 determines that the conversation in the vehicle is in the active state. The predetermined condition may be arbitrarily set, and for example, may include a condition that the volume be equal to or greater than a threshold value, a frequency distribution of the sound show a predetermined pattern, the conversation time be equal to or greater than a threshold value, the sound of laughter be detected, a smiling face be detected, the time for which occupants face each other be equal to or greater than a threshold value, or the like. The determiner 25 may determine the degree of activity in a plurality of levels with reference to threshold values which are set in stages. The determiner 25 may determine whether the conversation tends to become more active or not, and whether the conversation tends to become less active or not on the basis of a change in the degree of activity.

The topic provider 26 provides a topic to the inside of the vehicle on the basis of a determination result of the determiner 25. Content of the topic is for stimulating activity, and for example, is content included in conversation determined to be active by the determiner 25, or content included in conversation determined as somewhat active (the degree of activity is in a range of a predetermined threshold value), or the like. The topic provider 26 may acquire a theme or a keyword according to a hobby or an age of the occupant on the basis of the user registration information included in the user setting information 31, and may provide the topic according to the acquired information.

The movement plan setter 22 may change at least part of the set movement plan on the basis of the determination result by the determiner 25. Here, the movement plan setter 22 generates the movement plan on the basis of the determination result, in a range satisfying a condition (hereinafter referred to as a setting condition) of the movement plan determined by some or all of the setting information. For example, the setting condition includes an arrival time, the maximum necessary time, course content, and the like.

For example, in a case in which it is determined that the inside of the vehicle is in the active state, the movement plan setter 22 searches for a route from the current position of the vehicle to a destination by which the currently set arrival time is extended to the maximum necessary time. On the other hand, in a case in which it is determined that the inside of the vehicle is in an inactive state, the movement plan setter 22 may search for a route by which the arrival time is advanced. The movement plan setter 22 may search for a point on the map related to the active topic in the vehicle (hereinafter referred to as a relation point), and may search for a route to the relation point.

After the movement plan on which information is provided by the navigator 23 changes to the route for the relation point, the movement plan setter 22 may prohibit changing of the set movement plan for the relation point to another movement plan in which the relation point is not on a route.

The movement plan setter 22 may select one movement plan on the basis of attributes of the occupant indicated by the user registration information, among a plurality of movement plans generated on the basis of the setting information, and may set the selected movement plan as the guidance target by the navigator 23.

For example, the storage 30 is realized by a flash memory such as a random access memory (RAM), a read only memory (ROM), or a solid state drive (SSD), a hard disk drive (HDD), or the like. The storage 30 stores the user setting information 31, the map data 32, movement plan information 33, a determination reference value 34, topic information 35, and the like.

The user setting information 31 includes setting information set by the user, and the user registration information. The user setting information 31 is prepared for each user, and corresponds to unique information for identifying each user (hereinafter referred to as a user ID).

The map data 32 is information expressing a road shape by links which show a road, and nodes connected by the links. The map data 32 may include a curvature of the road, point of interest (POI) information, or the like.

The movement plan information 33 is the movement plan which is generated by the movement plan setter 22, and is information related to one movement plan which is set as the guidance target by the navigator 23. In a case in which the set movement plan changes, the movement plan information 33 is updated by the movement plan setter 22.

The determination reference value 34 is a reference value which is referred to by the determiner 25, and includes a condition for determining whether the conversation is in the active state or not, a threshold value for determining the degree of activity, and the like.

The topic information 35 is information related to the topic provided from the topic provider 26. For example, the topic information 35 includes a keyword included in the conversation which is determined as the conversation in the active state by the determiner 25, and the like. The topic information 35 is a theme or a keyword in which the user is interested, and may include information acquired from an external device by the topic provider 26 or the server 100 on the basis of the user registration information.

Figure 3:
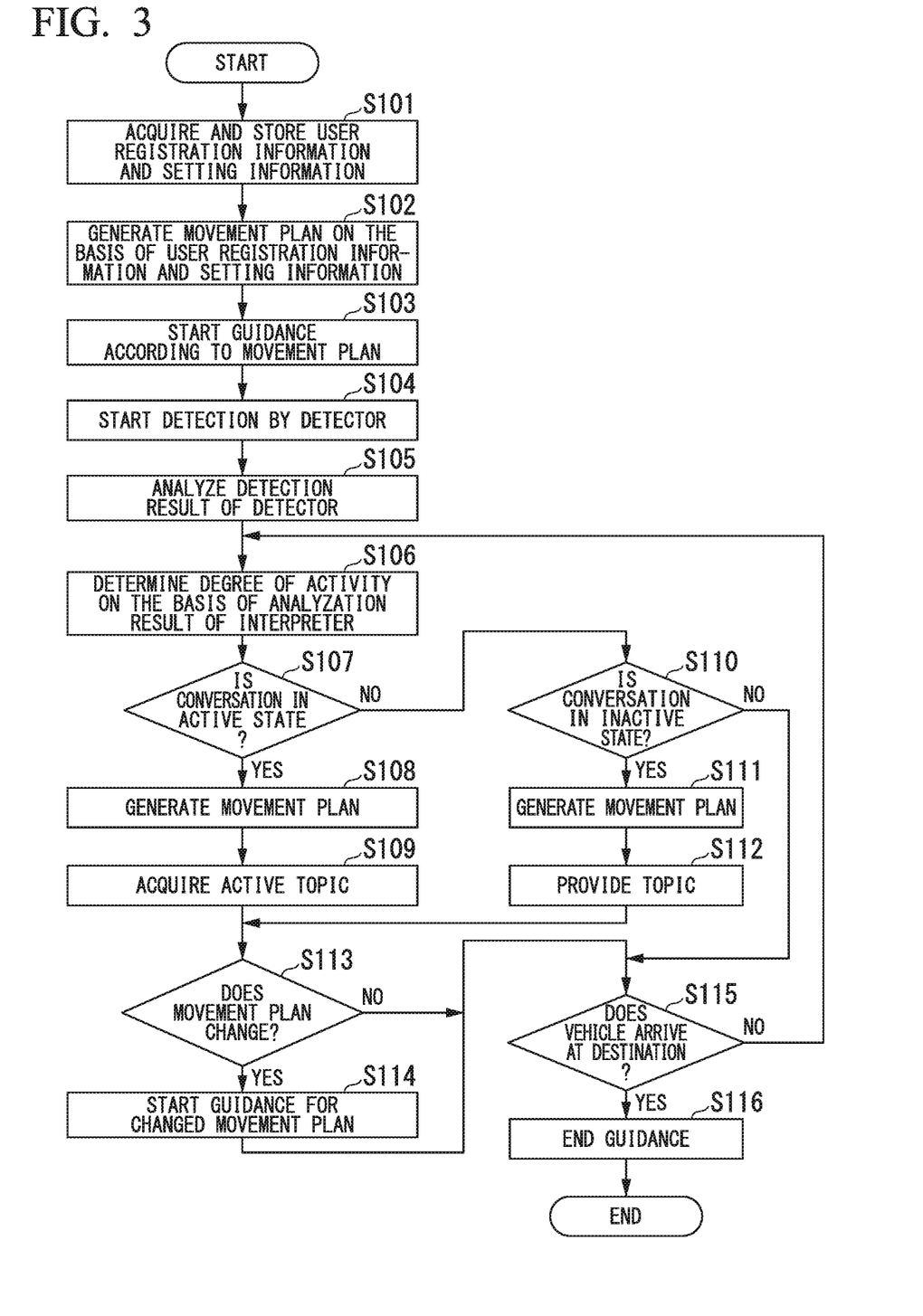
FIG. 3 is a flowchart showing processing performed by the navigation device.

Next, processing performed by the navigation device 10 will be described with reference to FIG. 3. FIG. 3 is a flowchart showing the processing performed by the navigation device 10.

First, the data manager 21 stores the user registration information or the setting information acquired using the communicator 11 or the input 12 in the user setting information 31 (step S101). Next, the movement plan setter 22 searches for the route from the position of the vehicle, which is specified by, for example, the GNSS receiver 13, to the destination or the stops on the basis of the user registration information and the setting information, and acquires one or more movement plans including one or more search results. The movement plan setter 22 stores one movement plan selected among the one or more movement plans in the movement plan information 33 (step S102). In addition, the navigator 23 starts course guidance according to the movement plan with reference to the movement plan information 33 (step S103). The vehicle starts driving according to the course guidance. The driving may be performed by automated driving, as will be described later.

Next, the detector 16 acquires the sound data or the image data, and outputs the sound data or the image data to the analyzer 24 (step S104). The analyzer 24 analyzes the content of the conversation in the vehicle on the basis of the detection result by the detector 16 (step S105). In addition, the determiner 25 determines the degree of activity of the conversation in the vehicle on the basis of the analyzation result by the analyzer 24 (step S106).

For example, the movement plan setter 22 determines whether the conversation in the vehicle is in the active state or not according to the determination result by the determiner 25 (step S107). In a case in which the determination result by the determiner 25 is the active state, the movement plan setter 22 searches for the route for delaying the arrival time, in the range satisfying the setting condition, and provides a search result to the occupant using the display 14 and the speaker 15 (step S108). In addition, the topic provider 26 acquires the conversation in the vehicle which is analyzed by the analyzer 24 to be in the active state, and stores the conversation in the topic information 35 (step S109).

On the other hand, in a case in which it is determined that the conversation in the vehicle is not in the active state, the movement plan setter 22 determines whether the conversation in the vehicle is in the inactive state or not according to the determination result by the determiner 25 (step S110). In a case in which the determination result by the determiner 25 is the inactive state, the movement plan setter 22 searches for the route for advancing the arrival time, in the range satisfying the setting condition, and provides a search result to the occupant using the display 14 and the speaker 15 (step S111). In addition, the topic provider 26 provides the topic to the occupant with reference to the topic information 35 (step S112). In a case in which the topic is not stored in the topic information 35, the topic provider 26 may read the user registration information from the user setting information 31, acquire the topic according to the hobby or the age of the occupant from the storage 30 (or the external device through the network NW), and provide the topic to the occupant.

The movement plan setter 22 determines whether an instruction for changing the movement plan from the occupant is present or not on the basis of the input information from the input 12 (step S113). In a case in which the instruction for changing the movement plan is present, the movement plan setter 22 updates the movement plan information 33 on the basis of the movement plan after the change. In addition, the navigator 23 starts the course guidance according to the movement plan after the change with reference to the movement plan information 33 (step S114).

Next, the navigator 23 determines whether the vehicle arrives at the destination or not (step S115). In a case in which the vehicle does not arrive at the destination, the navigation device 10 returns to step S106 and repeats the process. On the other hand, in a case in which the vehicle arrives at the destination, the navigator 23 ends the guidance (step S116).

Figure 4:
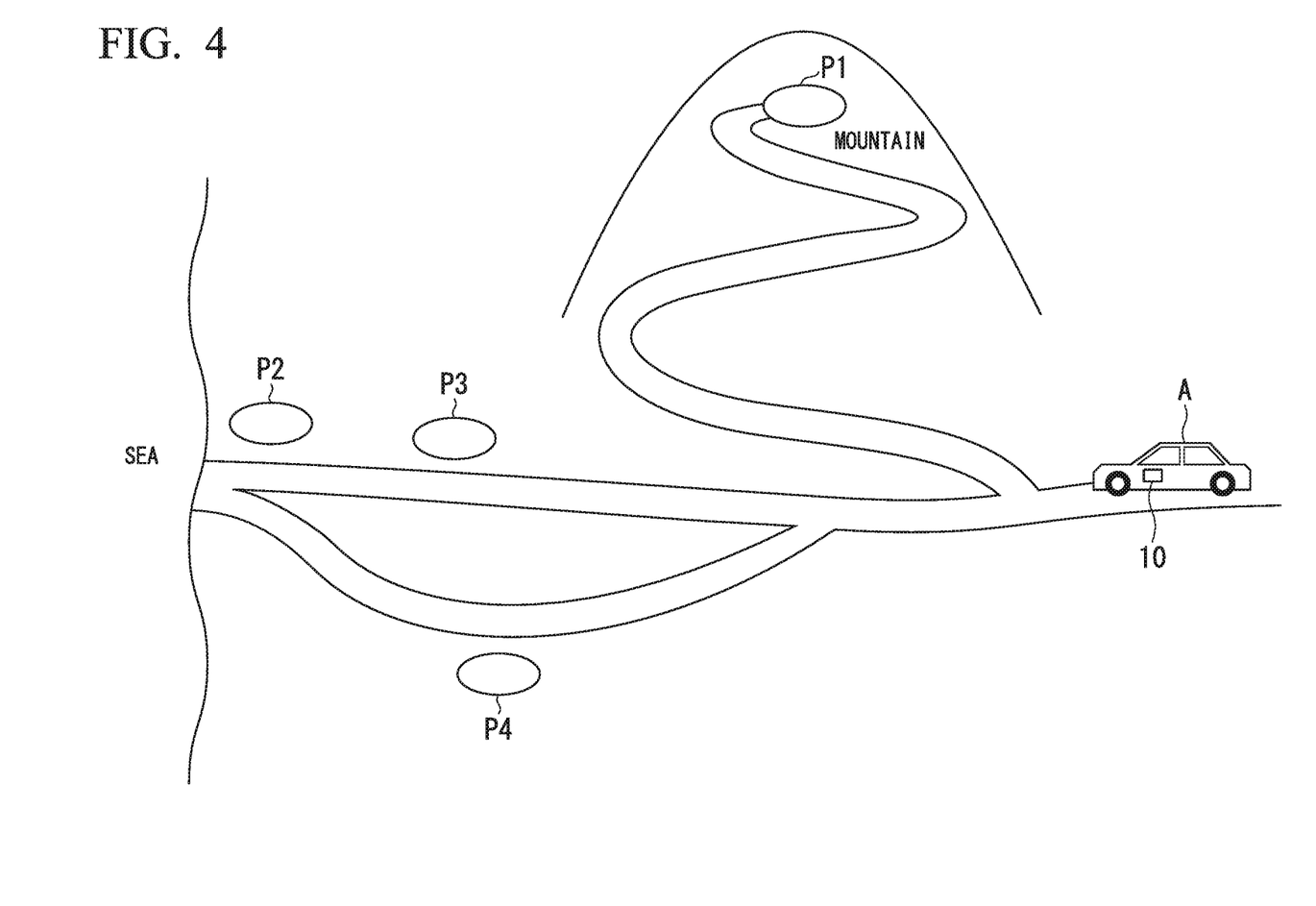
FIG. 4 shows an example of a driving route of a vehicle in which the navigation device is installed.

Next, an example of a driving route of the vehicle in which the navigation device 10 is installed will be described with reference to FIG. 4. FIG. 4 shows the example of the driving route of the vehicle in which the navigation device 10 is installed. FIG. 4 shows a state in which the vehicle A in which the navigation device 10 is installed is positioned at a start point. It is assumed that "a course to go out for two hours" is set as the setting information of the vehicle A. In this case, no destination or arrival time is determined.

The movement plan setter 22 determines the destination according to the content of the conversation in the vehicle on the basis of the analyzation result by the analyzer 24. For example, in a case in which the content of the conversation in the vehicle is content related to the outdoors, a barbeque, or the like, the movement plan setter 22 searches for places at which the vehicle will arrive in two hours and barbeque is allowed, and determines the closest place (for example, a campground P1 in a mountain) as a first destination among the search results. In addition, the movement plan setter 22 generates a movement plan to the first destination, and stores the movement plan in the movement plan information 33. Therefore, the navigator 23 performs course guidance to the campground P1 in the mountain.

In addition, it is assumed that a topic related to the sea is active in the vehicle. In this case, the movement plan setter 22 searches for a barbeque area where the sea is visible in the range satisfying the setting condition. In a case in which a costal barbeque area P2 is obtained by the search, the movement plan setter 22 sets the costal barbeque area P2 as a second destination, generates a movement plan including the shortest route to the second destination, and stores the movement plan in the movement plan information 33. The shortest route is a route passing through a stop P3. Therefore, the navigator 23 changes the destination from the mountain to the sea, and performs course guidance to the costal barbeque area P2.

Next, it is assumed that the conversation in the vehicle is in the active state. In this case, the movement plan setter 22 searches for a route for delaying the arrival time to the second destination in the range satisfying the setting condition. The movement plan setter 22 obtains a route passing through a stop P4 through the search, and stores the route in the movement plan information 33. Therefore, the navigator 23 may change the route passing through the stop P3 to the route passing through the stop P4, and may perform course guidance of the route for delaying the arrival time to the second destination.

In a case in which there is no place where barbeque materials can be obtained in the route passing through the stop P4 while barbeque materials can be obtained at the stop P3, the movement plan setter 22 may prohibit changing to the route passing through the stop P4.

Second Embodiment

Next, a navigation system 1A according to the second embodiment will be described with reference to FIG. 5. The navigation system 1A is mainly different from the navigation system 1 according to the first embodiment in that the analyzer 24, the determiner 25, and the topic provider 26 are installed on a server 100A. Hereinafter, the difference between the first embodiment and the second embodiment will be described, and descriptions of constitutions having the same functions are omitted.

Figure 5:
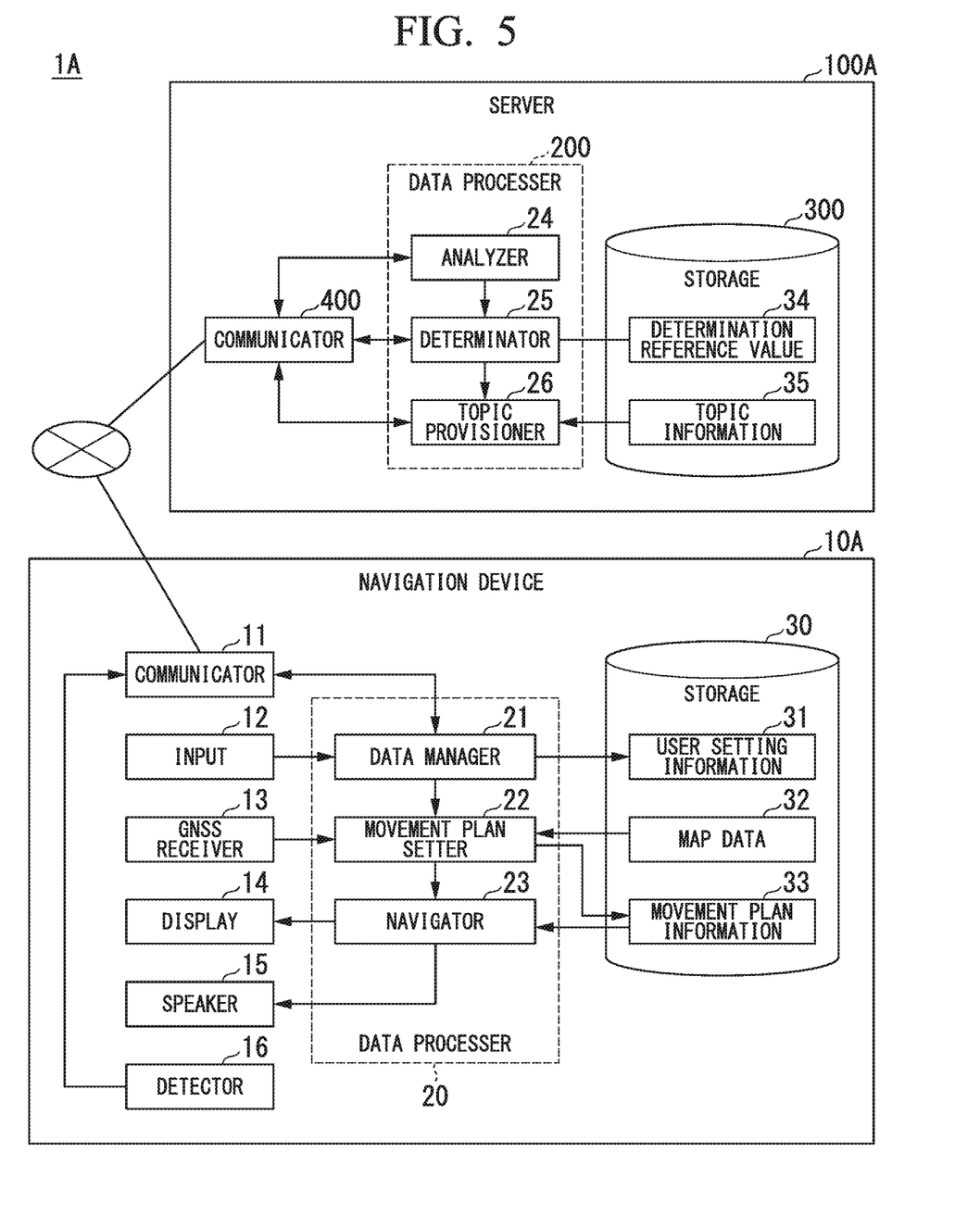
FIG. 5 is a diagram showing a functional constitution of a navigation system according to a second embodiment.

FIG. 5 is a diagram showing a functional constitution of the navigation system 1A. As shown in FIG. 5, the navigation system 1A includes a navigation device 10A and the server 100A. The server 100A includes a data processor 200, a storage 300, and a communicator 400. The data processor 200 includes the analyzer 24, the determiner 25, and the topic provider 26. The storage 300 stores the determination reference value 34 and the topic information 35. The communicator 400 communicates with the navigation device 10A through the network NW.

The server 100A receives the input information received using the input 12, the detection result of the detector 16, the setting information, the user registration information, and the like from the navigation device 10A, and outputs the input information to the data processing unit 200. In addition, the server 100A transmits the analyzation result of the analyzer 24, the determination result of the determiner 25, the topic provided by the topic provider 26, and the like to the navigation device 10A. Therefore, the navigation device 10A may change at least part of the set movement plan, or may provide the topic to the occupant on the basis of the information received from the server 100A.

According to the embodiment described above, the determiner 25 which determines the degree of activity of the conversation in the vehicle on the basis of the detection result of the detector 16, and the movement plan setter 22 which changes at least part of the set movement plan on the basis of the determination result of the determiner 25 are provided. Therefore, it is possible to change the movement plan according to the activity in the vehicle, and thus the user can enjoy a drive suitable for an atmosphere in the vehicle.

According to the embodiment described above, the topic provider 26 which provides the topic to the inside of the vehicle is further provided. Therefore, the conversation in the vehicle is stimulated, and thus friendship between occupants can be promoted.

According to the embodiment described above, the analyzer 24 which analyzes the content of the conversation in the vehicle is further provided, and the movement plan setter 22 changes at least part of the set movement plan on the basis of the analyzation result by the analyzer 24. Therefore, it is possible to change the movement plan according to the conversation in the vehicle, and thus the user can enjoy a drive suitable for the conversation in the vehicle.

According to the embodiment described above, the movement plan setter 22 searches for the relation point on the map related to the active topic on the basis of the analyzation result of the analyzer 24 and the determination result of the determiner 25, and changes the movement plan to the movement plan for the relation point. Therefore, it is possible to go to a place mentioned in the conversation, and thus a drive can be further enjoyed.

According to the embodiment described above, in a case in which the relation point is not on the route when the set movement plan changes, the movement plan setter 22 prohibits changing of the set movement plan. Therefore, it is possible to set the movement plan of which a priority is the topic in the vehicle in comparison with the activity in the vehicle.

Third Embodiment

Figure 6:
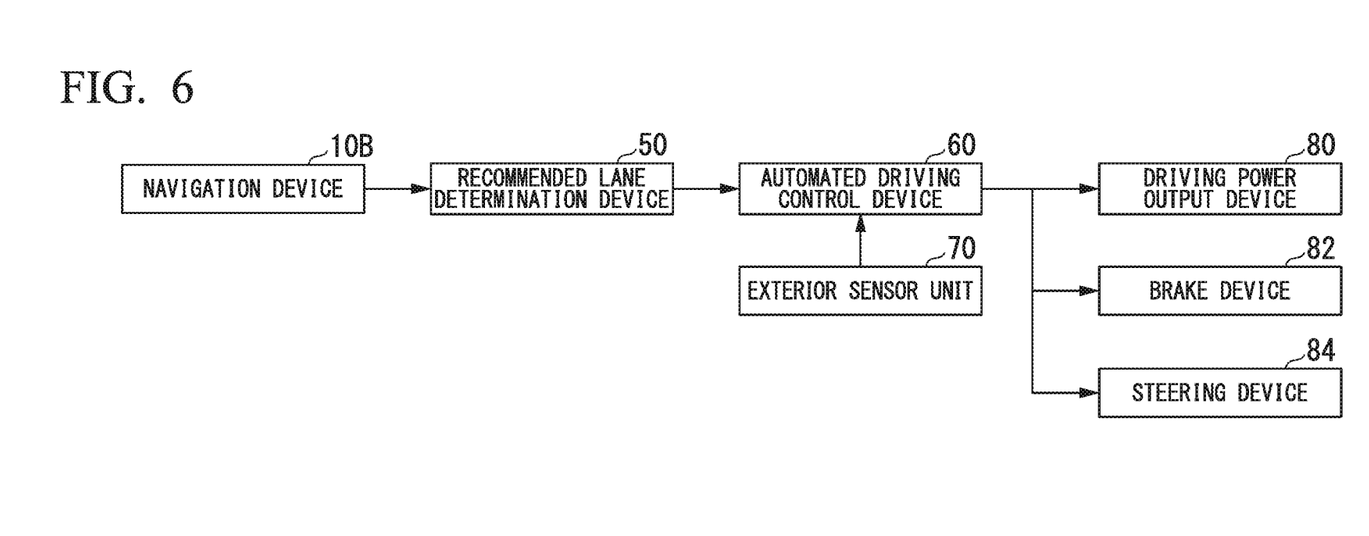
FIG. 6 is a constitution diagram of a vehicle system according to a third embodiment.

The navigation device 10 of the first embodiment or the navigation device 10A of the second embodiment may be applied to an automated driving vehicle. FIG. 6 is a constitution diagram of a vehicle system according to the third embodiment. A navigation device 10B outputs the movement plan determined by the processing which has been described in the first embodiment or the second embodiment together with, for example, target pass times for each reference point, to a recommended lane determination device 50. The recommended lane determination device 50 determines a recommended lane in which the vehicle drives with reference to a map which is more detailed than the map data 32 included in the navigation device 10B, and outputs the recommended lane together with, for example, the target pass times for each reference point to an automated driving control device 60.

The automated driving control device 60 controls part or all of a driving power output device 80 including an engine or motor, a brake device 82, and a steering device 84 so that the vehicle drives according to the recommended lane which is input from the recommended lane determination device 50 on the basis of information input from an exterior sensor unit 70 including a camera or radar device, a light detection and ranging or laser imaging detection and ranging (LIDAR), an object recognition device, and the like. At this time, the automated driving control device 60 determines a future target track and speed so that the input target pass times for each reference point are satisfied.

In the third embodiment, the setting information which is input by the occupant by using the input 12 may include information on "driving a scenic course for about one hour." The navigation device 10B of the third embodiment automatically generates a course on the basis of the setting information with reference to the map data 32.

For example, the navigation device 10B sets a point at which the vehicle arrives after the vehicle drives the scenic course for an hour from a departure point as the destination, and sets the movement plan to the destination. In this case, the navigation device 10B may set a landmark or a tourist spot as the destination in the range satisfying the setting condition determined by the setting information. During the automated driving, in a case in which it is determined that the inside of the vehicle is in the active state, the navigation device 10B searches for a route for delaying the arrival in the range satisfying the setting condition determined by the setting information. In a case in which it is determined that the inside of the vehicle is in the active state when the vehicle arrives at the destination, the navigation device 10B may release the setting of the destination, search for a route for the vehicle to drive around within, for example, a predetermined time (for example, 15 minutes), and set the route as the movement plan.

The setting information which is input by the occupant using the input 12 may include information on "after driving a scenic course for about one hour, eating lunch." In this case, the navigation device 10B sets a restaurant at which the vehicle will arrive after the vehicle drives the scenic course for about an hour from a departure point as the destination, and sets the movement plan to the destination. During the automated driving, in a case in which it is determined that the inside of the vehicle is in the active state, the navigation device 10B changes the destination to another restaurant for delaying the arrival, and sets a movement plan to the destination after the change. On the other hand, during the automated driving, in a case in which it is determined that the inside of the vehicle is in the inactive state, the navigation device 10B changes the destination to another restaurant for advancing the arrival, and sets a movement plan to the destination after the change.

In a case in which it is impossible to change the destination, such as a case in which the destination is set as a house, the navigation device 10B may generate a movement plan in which the vehicle passes through the vicinity of the destination and returns to the destination for delaying the arrival.

In the third embodiment, delaying the arrival at a specific point may be realized by driving at a low speed in the automated driving, as well as changing the course.

Although forms for implementing the present invention have been described above using embodiments, the present invention is not limited to the embodiments, and various modifications and substitutions can be made without departing from the spirit or scope of the present invention.

Some or all of the functions of the navigation device 10 may be realized by a function of a terminal device such as a smart phone or a tablet terminal possessed by the occupant. For example, the navigation device 10 may transmit the current position, the setting information, or the like to the server 100 through the communicator 11, and may perform the course guidance on the basis of the movement plan generated by the server 100.

In a case in which the movement plan setter 22 changes the setting to the movement plan having a route of which at least a part changes, the movement plan setter 22 may automatically change the setting without confirming with the occupant.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A navigation system for guiding a vehicle to a destination, comprising:
a processor; and
a memory that stores executable instructions that, when executed by the processor facilitates performance of operations, comprising:
detecting, via a microphone device, a sound wave originating from the inside of the vehicle;
identifying the sound wave as representing a conversation between at least two occupants in the vehicle by:
determining that an amplitude of the sound wave is equal to or greater than a first an amplitude threshold value;
determining that the duration of time that the amplitude of the sound wave is equal to or greater than the amplitude threshold value is equal to or greater than a time threshold value;
determining that a sound pattern of the sound wave matches a predetermined sound pattern of laughter;
determining a movement plan based on setting information input by a user, and based on the identification of the conversation, changing at least a part of the movement plan, wherein the setting information comprises a destination; and
facilitating navigation of the vehicle to the destination based on the movement plan and signal data received from a global positioning satellite system.

2. The navigation system of claim 1, wherein the operations further comprise:
based on the identification of the conversation, acquiring a theme or a keyword, and providing, via a display device or a speaker device, a topic to the interior of the vehicle based on the theme or the keyword.

3. The navigation system of claim 1, wherein the operations further comprise:
converting the sound wave to text data;
outputting the text data to a display device; and
changing at least a part of the movement plan based on the text data.

4. The navigation system of claim 3, wherein the operations further comprise searching for a relation point on a map which is related to an active topic identified based on the identification of the conversation and the text data, and changing at least a part of the movement plan based on the location of the relation point on the map.

5. The navigation system of claim 1, wherein the operations further comprise changing a route based on an updated arrival time at the destination.

6. A non-transitory computer-readable medium, comprising executable instructions that, when executed by a processor, facilitate performance of operations, comprising:
detecting, via a microphone device, a sound wave originating from the inside of a vehicle;
identifying the sound wave as representing a conversation between at least two occupants in the vehicle by:
determining that an amplitude of the sound wave is equal to or greater than a first an amplitude threshold value;
determining that the duration of time that the amplitude of the sound wave is equal to or greater than the amplitude threshold value is equal to or greater than a time threshold value; and
determining that a sound pattern of the sound wave matches a predetermined sound pattern of laughter;
determining a movement plan based on setting information input by a user;
based on the identification of the conversation, changing at least a part of the movement plan, wherein the setting information comprises a destination; and
facilitating navigation of the vehicle to the destination based on the movement plan and signal data received from a global positioning satellite system.

7. A navigation system for guiding a vehicle to a destination, comprising:
a processor; and
a memory that stores executable instructions that, when executed by the processor facilitates performance of operations, comprising:
detecting, via a microphone device, a sound wave originating from the inside of the vehicle;
identifying the sound wave as being representative of a conversation between at least two occupants in the vehicle by:
determining that an amplitude of the sound wave is equal to or greater than a first an amplitude threshold value;
determining that the duration of time that the amplitude of the sound wave is equal to or greater than the amplitude threshold value is equal to or greater than a time threshold value;
determining that a sound pattern of the sound wave matches a predetermined sound pattern of laughter;
determining a movement plan based on setting information input by a user, and based on the identification of the conversation, changing at least a part of the movement plan, wherein the setting information comprises a destination;
facilitating navigation of the vehicle to the destination based on the movement plan and signal data received from a global positioning satellite system;
converting the sound wave to text data;
outputting the text data to a display device;
changing at least a part of the movement plan based on the text data;
searching for a relation point on a map which is related to an active topic identified based on the identification of the conversation and the text data;
changing at least a part of the movement plan based on the location of the relation point on the map;
storing user registration information comprising attribute data representative of the user; and
selecting the movement plan based on the attribute data.

* * * * *